(12) United States Patent
Hinderthür et al.

(10) Patent No.: US 8,774,628 B2
(45) Date of Patent: Jul. 8, 2014

(54) REMOTE NODE AND NETWORK ARCHITECTURE AND DATA TRANSMISSION METHOD FOR A FIBER-OPTIC NETWORK, ESPECIALLY FOR LOW BIT-RATE DATA TRANSMISSION

(75) Inventors: Henning Hinderthür, Finning (DE); Klaus Grobe, Planegg (DE)

(73) Assignee: ADVA Optical Networking SE, Meiningen (DE)

( * ) Notice: Subject to any disclaimer, the term of this patent is extended or adjusted under 35 U.S.C. 154(b) by 106 days.

(21) Appl. No.: 13/315,176

(22) Filed: Dec. 8, 2011

(65) Prior Publication Data

US 2013/0094857 A1 Apr. 18, 2013

(30) Foreign Application Priority Data

Oct. 12, 2011 (EP) .................................... 11401613

(51) Int. Cl.
*H04B 10/00* (2013.01)
(52) U.S. Cl.
USPC ............................................. 398/59; 398/70
(58) Field of Classification Search
USPC .......................................... 398/59, 60, 66–73
See application file for complete search history.

(56) References Cited

U.S. PATENT DOCUMENTS

| | | | | |
|---|---|---|---|---|
| 4,234,969 A * | 11/1980 | Singh | ............................... | 398/66 |
| 4,234,970 A * | 11/1980 | Beasley et al. | ................ | 398/175 |
| 4,948,218 A * | 8/1990 | Kobayashi et al. | ........... | 398/141 |
| 5,050,164 A * | 9/1991 | Chao et al. | ...................... | 398/67 |
| 6,889,010 B2 * | 5/2005 | Trezza | ........................... | 398/130 |
| 7,095,958 B1 * | 8/2006 | Woodward | ....................... | 398/72 |
| 7,106,968 B2 * | 9/2006 | Lahav et al. | ..................... | 398/47 |
| 7,120,359 B2 * | 10/2006 | Way | ................................. | 398/59 |
| 7,321,729 B2 * | 1/2008 | Gumaste et al. | ................ | 398/59 |
| 7,369,765 B2 * | 5/2008 | Aoki et al. | ...................... | 398/45 |
| 7,386,236 B1 * | 6/2008 | Kuo et al. | ....................... | 398/99 |
| 7,394,984 B1 * | 7/2008 | Woodward | ....................... | 398/72 |
| 7,433,601 B2 * | 10/2008 | Kai | ................................. | 398/85 |
| 7,519,294 B2 * | 4/2009 | Bullock | ........................... | 398/59 |
| 7,519,297 B2 * | 4/2009 | Hahin et al. | ................... | 398/115 |

(Continued)

FOREIGN PATENT DOCUMENTS

GB 2087679 A 5/1982

OTHER PUBLICATIONS

EPO, Extended European Search Report issued Mar. 23, 2012 in corresponding European patent application No. 11401613.2 (7 pages).

*Primary Examiner* — Agustin Bello
(74) *Attorney, Agent, or Firm* — The Culbertson Group, P.C.

(57) ABSTRACT

A remote node architecture for a fiber-optic network, especially for low bit-rate data transmission, the fiber-optic network architecture comprises a central node and a plurality of remote nodes serially connected to each other or to the central node, respectively. The central node and the remote nodes are capable of communicating by means of digital optical signals created by the central node or a respective remote node, each digital optical signal comprising a data frame. The remote node comprises an optical connection network, a single transceiver device comprising an optical receiver unit and an optical transmitter unit, and an electronic controller device for controlling the transceiver device. The optical connection network defines a western optical connection port, an eastern optical connection port, an internal optical receiving port being connected to the optical receiver unit and an internal optical transmitting port being connected to the optical transmitter unit.

13 Claims, 2 Drawing Sheets

(56) References Cited

U.S. PATENT DOCUMENTS

| | | | |
|---|---|---|---|
| 7,526,198 B1 * | 4/2009 | Chiu et al. | 398/19 |
| 7,570,887 B2 * | 8/2009 | Rohrer et al. | 398/73 |
| 7,603,035 B2 * | 10/2009 | Kinoshita et al. | 398/59 |
| 7,609,966 B2 * | 10/2009 | Gumaste et al. | 398/59 |
| 7,616,890 B2 * | 11/2009 | Orbach et al. | 398/67 |
| 7,769,290 B2 * | 8/2010 | Smith | 398/5 |
| 7,805,075 B2 * | 9/2010 | Chiu et al. | 398/19 |
| 7,865,081 B1 * | 1/2011 | Woodward | 398/72 |
| 8,014,671 B1 | 9/2011 | Stevens | |
| 8,175,458 B2 * | 5/2012 | Way | 398/72 |
| 8,184,974 B2 * | 5/2012 | Cline | 398/66 |
| 8,391,711 B2 * | 3/2013 | Iwasawa et al. | 398/62 |
| 8,478,124 B1 * | 7/2013 | Zanoni et al. | 398/68 |
| 2002/0041410 A1 * | 4/2002 | Patel et al. | 359/124 |
| 2002/0067523 A1 * | 6/2002 | Way | 359/119 |
| 2002/0163687 A1 * | 11/2002 | Boden | 359/119 |
| 2004/0240884 A1 * | 12/2004 | Gumaste et al. | 398/59 |
| 2006/0133810 A1 * | 6/2006 | Inbar et al. | 398/70 |
| 2009/0142060 A1 * | 6/2009 | Strasser et al. | 398/68 |
| 2010/0098418 A1 | 4/2010 | Bouet et al. | |
| 2013/0094857 A1 * | 4/2013 | Hinderthur et al. | 398/58 |

* cited by examiner

REMOTE NODE AND NETWORK ARCHITECTURE AND DATA TRANSMISSION METHOD FOR A FIBER-OPTIC NETWORK, ESPECIALLY FOR LOW BIT-RATE DATA TRANSMISSION

FIELD OF THE INVENTION

The invention relates to a remote node architecture for a fiber-optic network, especially for low bit-rate data transmission, and to a fiber-optic network architecture comprising such remote node architectures as well as to a data transmission method suitable therefore.

BACKGROUND

Recently, especially in the context of the so-called "smart metering" application, public or private utility companies have started to deploy their own communication networks. These networks (referred to as sensor networks in the following) may, for example, connect commercial end users to the different levels of voltage transformer stations. These may be low voltage, medium voltage or high voltage transformers or even the respective energy dispatch center. To a wide extent, optical fiber infrastructure will be used for these communication networks. The whole network setup and hierarchy is quite similar to a telecommunication application. However, the actual bandwidth demand per end customer is significantly lower. In particular, the network area on the level of low voltage transformers is different to a telecommunication company's transmission network, especially with respect to the bandwidth required and desired network topology. Typically, a data transmission rate of a few Mbit/s per low voltage transformer node will be sufficient, and relatively large sub-network domains of up to 100 nodes in a linear bus geometry may be advantageous as a physical network topology. Of course, also a sufficiently high availability of the required network connections including fiber protection is desirable.

As a linear bus geometry or a physical linear bus architecture, respectively, is desirable, a classic time division multiplex (TDM) network, for example a network according to the synchronous optical network (SONET) standard or the newer synchronous digital hierarchy (SDH) standard, could be chosen for this data transmission application. A TDM network would meet the requirements as to data transmission rate and the network nodes with their East/West interface structure would easily enable to realize the bus structure. However, as such a sensor network should be realizable and maintainable at acceptably low costs, the classic TDM structure (SONET/SDH) and the known structures for suitable network nodes are too complex and too expensive. Especially, providing separate interfaces for the eastern and western ports of a remote node suitable for such linear TDM structures lead to inacceptably high costs.

SUMMARY OF THE INVENTION

The present invention provides a remote node architecture for a fiber-optic network having a linear chain-like structure with a high number of network nodes, especially for low bit-rate data transmission, which reveals a simple structure that is realizable at low cost. Other embodiments provide a fiber-optic network system architecture comprising remote nodes having such an architecture and a method for transmitting digital data in a fiber-optic network having a respective network architecture.

In such a system, as compared to known remote nodes used in linear optical data transmission links having two separate transceiver units for the eastern and western port, a much less complex structure of a remote node may be used, if a simultaneous data transmission in both directions is acceptable. This, of course, reduces the maximum information transmission capacity of the network, which, however, does not play a decisive role in a low bit-rate data transmission network.

The remote node architecture according to the invention preferably includes a single transceiver unit, only, and an optical connection network having an eastern and western optical connection port defining the eastern and western port of the remote node architecture and an internal optical receiving and transmitting port connected to the optical receiver unit and the optical transmitter unit of the transceiver unit, respectively. The optical connection network is designed such that an optical transmit signal or an optical regenerated signal created by the optical transmitter unit is supplied to both the eastern and western optical connection ports. Likewise, an optical signal received at the eastern or western optical connection port is at least supplied to the optical receiver unit. The digital optical signals transmitted over a respective optical network architecture including a plurality of remote nodes in a linear chain-like structure and at least one central node at the end of the chain include a data frame comprising at least content and address data. The address data at least include the address of the central node or the remote note which shall receive the respective frame (i.e. the end point of the respective transmission link). In general, the transmission link is terminated by a central node at one end and a selected remote node at the other end of the link. Further, the transmission link in general is a bidirectional transmission link. At least a hand shake protocol will be used in order to establish the link and, if necessary, to control the data transmission over the link. However, in most applications, also content data may be transmitted in both directions.

Each remote node which is not the addressed end point of the transmission link creates a regenerated signal by means of the single transceiver unit that is simultaneously transmitted in both directions.

Thus, the invention provides a simple optical remote node architecture that can be realized at low cost.

The optical connection network may simply be realized as a 2×2 port optical coupling means, preferably a 2×2 3 dB optical coupler. Two of the ports of the optical coupling means define the western optical connection port and the eastern optical connection port, and the two other ports of the optical coupling means define the internal optical receiving port and the internal optical transmitting port. In this way, the connection network is realized at extremely low cost.

According to a preferred embodiment of the invention, the controller device, when regenerating a digital optical transmit signal or regenerated digital optical signal that has been received, marks the at least one regenerated data frame as having been regenerated by the respective remote node and, when having received a digital optical transmit or regenerated signal not addressed to the respective remote node, detects whether the frame of the signal received includes a marker indicating that the signal has already been regenerated by the respective remote node and, if so, suppresses the transmission of an again regenerated digital optical regenerated signal. As a result, the problem of endlessly transmitting frames with identical content data back and forth is avoided.

The controller device may preferably perform a so-called 3D regeneration, that is a signal regeneration with respect to the signal timing, shape and amplitude.

The controller device may include storage means for storing information concerning the fiber-optic network architecture so that the controller device can determine whether the respective remote node lies within the communication path of the respective transmission link (i.e., the path between the central node and the remote node between which the information included in the optical transmit signal received or in the regenerated optical signal received is to be exchanged) and thus suppress creating a regenerated signal, if the position of the remote node is outside the communication path. This enables to increase the overall data transmission capacity of the network as further transmission links between a further remote node and a central node may be established earlier or simultaneously by using the remaining unused path.

It shall be mentioned that communication is not restricted to a communication between a central node (at the end of the chain-like structure) and a selected remote node but may also be provided between two selected remote nodes using the same transmission principle.

Of course, the western optical connection port and the eastern optical connection port of a remote node architecture according to the invention may preferably be designed as single fiber working ports adapted to be connected to a single optical waveguide. Thus, a respective remote node can be used in a single fiber-optical network having a chain-like structure which can be established at low cost.

A preferred embodiment of the network architecture comprises a second central node at the other end of the chain-like structure of serially connected remote nodes. This enables the transmitting of data to both ends of the chain-like structure.

If the two central nodes are provided at the same location, the network architecture forms an open ring architecture providing fiber protection. That is, if the communication path between a first central node and a selected remote node is interrupted, for example by an intermediate remote node that has failed or by a broken optical fiber, the communication path between the respective other port of the remote node and the second central node may be used. Of course, the two central nodes may be realized by an integrated central node equipment and/or connected to a higher level control device which takes over the task of switching from the working communication path to the protection communication path and vice versa.

If generating of optical regenerated signals is suppressed in nodes that are not included in a given communication path, it is possible to use the other portion of the open ring structure to simultaneously establish a communication between the other central node and each of the remote nodes that are not included in the first given communication path, apart from the remote node directly neighboring the remote node forming the end point of the first given communication path as this directly neighboring remote node receives optical transmit signals created by the remote node forming the end point of the first given communication path.

Further embodiments of the invention are apparent from the dependent patent claims below.

DETAILED DESCRIPTION

Figure 1:
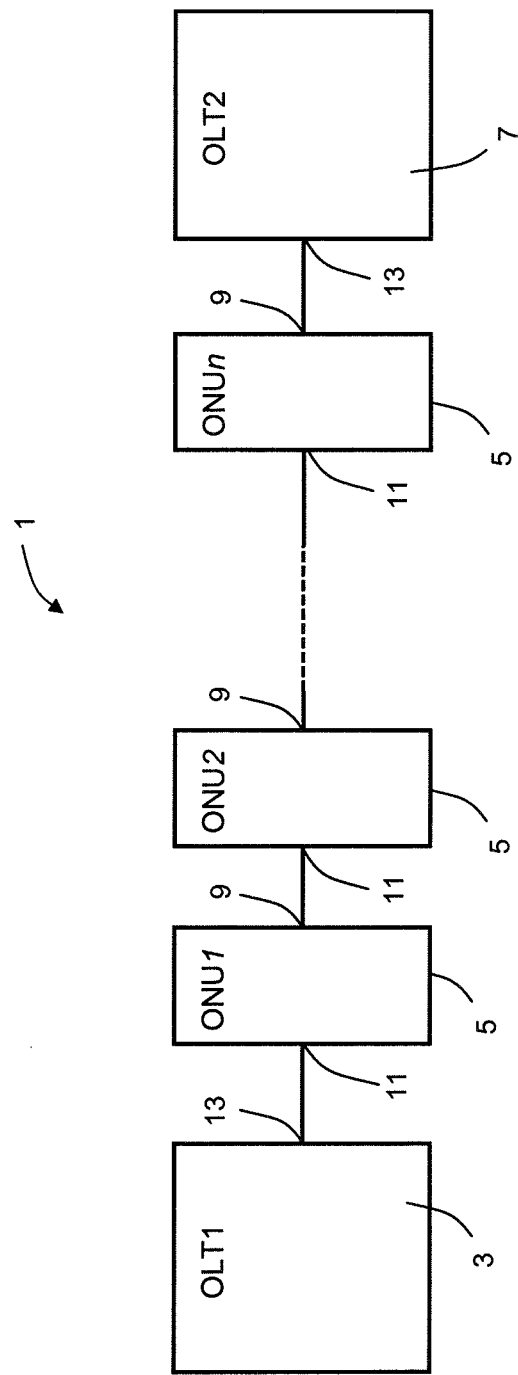
FIG. 1 is a schematic block diagram of a fiber-optic network architecture having a linear chain-like structure and including a central node at both ends of a chain of remote nodes.

FIG. 1 shows a schematic block diagram of a fiber-optic network architecture 1 comprising a western central node 3, also designated as "optical line terminal" OLT1, a plurality of N remote nodes 5, also designated as "optical node units" ONUi with i=1, . . . N, and a second or eastern central node 7, also designated as "optical line terminal" OLT2. The remote nodes 5 are connected in the form of a chain wherein each remote node 5 includes an eastern and western optical connection port 9, 11. The single connection port 13 of the western central node 3 is connected to the western connection port 11 of the first of the remote nodes 5, and the single connection port 13 of the eastern central node 7 is connected to the eastern connection port 9 of the Nth remote node 5. Further, the eastern connection port 9 of a first of two neighboring remote nodes 5 is connected to the western connection port 11 of the second one of the two neighboring remote nodes 5. The respective ports are connected by an optical path which, in general, will be realized as a single optical fiber. The central nodes 3, 7 at both ends of the fiber-optic network architecture 1 shown in FIG. 1 may of course also be physically located at the same place and even be housed in the same casing or rack. In this case, as will become apparent from the below description, the fiber-optic network architecture 1 according to FIG. 1 will assume the form of an open ring-like architecture.

At any rate, the architecture 1 shown in FIG. 1 realizes a path protection. This means, if a predetermined optical node 5 communicates with one of the central nodes 3, 7 and the optical path is interrupted, for example due to an interruption of the optical fiber, the predetermined remote note 5 is still able to communicate with the respective other central node 7, 3. Thus, the desired information may be transmitted to the desired location by replacing the original working path with a protection path. If the two central nodes 3, 7 are both physically present at the same location, an original working path between a given remote node and one of the central nodes may be replaced by a protection path between the respective other connection port of the given remote node and the respective other central node. If the two central nodes 3, 7 are physically present at different locations, the network architecture shown in FIG. 1 is able to realize a portion of the protection path, namely, the portion between the respective other connection port of the respective remote node 5 and the respective other central node 3, 7. The remaining portion between the central node 3, 7 at the end of the protection path realized by the structure according to FIG. 1 may be realized by a further network architecture (not shown) which connects the respective central node 3, 7 to a further central node (not shown) being physically present at the location of the central node at the end of the working path.

The connection ports 9, 11, 13 of the nodes 5 and 3, 7 are realized as connection ports for connecting a respective optical path consisting of a single fiber used for bidirectional communication.

Figure 2:
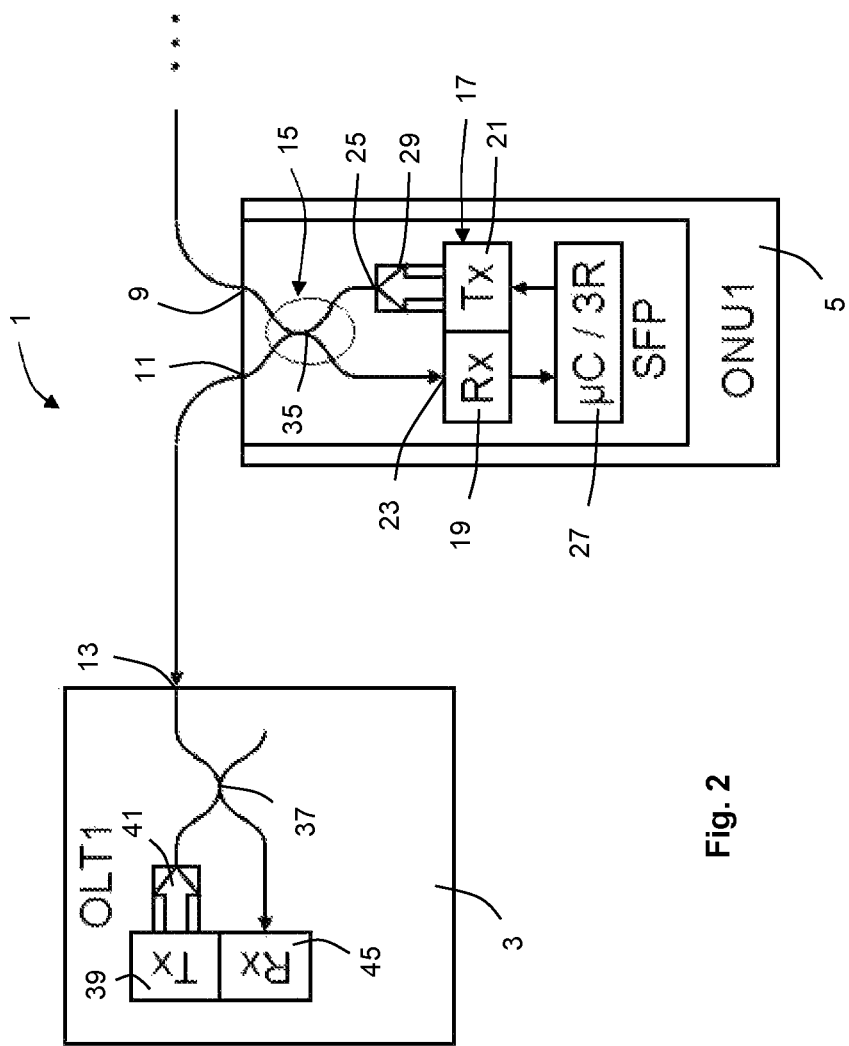
FIG. 2 is a more detailed schematic block diagram of the western central node and the first remote node of the network in FIG. 1.

FIG. 2 shows in more detail the structure of the western central node 3 and the first remote node 5.

Each remote node 5 comprises an optical connection network 15 that is realized by passive optical components, only, and represents an optical quadripole. Two first ports of the optical connection network 15 are connected to or define the eastern and western connection ports 9, 11 of the remote node 5. Further, each remote node 5 includes a transceiver device 17 comprising a receiver unit 19 and a transmitter unit 21. An optical input port of the receiver unit 19 is connected to an internal optical receiving port 23 of the optical connection network 15, and an internal optical transmitting port 25 of the optical connection network 15 is connected to an optical output port of the transmitter unit 21. As shown in FIG. 2, the optical quadripole may be realized as simple wavelength-independent optical 2×2 coupler 35 having a coupling ratio of, preferably, 3 dB.

The receiver unit 19 of the transceiver device 17 is adapted to receive an optical signal at the respective optical input port and to supply a respective converted (and, as the case may be, electrically processed) electrical signal to a controller device 27.

The transmitter unit 21 is adapted to receive a respective electrical signal from the controller device 27 and to convert (and, as the case may be, electrically and/or optically process) this signal into a corresponding optical signal.

In order to protect the transmitter unit 21 from an optical signal which is guided into the direction of the internal optical transmitting port 25, the transmitter unit 21 comprises an optical isolator 29.

In the same way, the remote node 5 according to FIG. 2 is capable of transmitting an optical signal that is supplied to the internal optical transmitting port 25 simultaneously to the eastern and western connection port 9, 11.

Thus, if the original working path between either the eastern or western connection port 9,11 of a selected remote node 5 and the respective central node 3, 7 is interrupted, the communication can be switched to a protection path between the respective other connection port 9, 11 and the respective other central node 3, 7. Of course, if desired, the optical signal created by the transmitter unit 21 that is simultaneously transmitted (this means via the working path and protection path) to the respective central node 3, 7 can be received and processed in both central nodes 3, 7.

FIG. 2 also shows a schematic structure of the central node 3. Of course, the same structure may be used for realizing the central node 7. The central node 3 comprises a 3 dB 2×2 coupler, a first port of which is connected to the connection port 13. A second port is connected to a transmitter unit 39 which also comprises an optical isolator 41. The transmitter unit 39 may be electrically connected to a controller device (not shown) being adapted to control the transceiver unit 39 and to receive an electrical receive signal of a receiver unit 45. Of course, as in case of the remote node 5, the transmitter unit 39 and the receiver unit 45 can be combined to a transceiver unit. The receiver unit 45 is adapted to receive an optical signal from a third port of the optical 3 dB 2×2 coupler 37 and to convert the optical signal into a corresponding electrical signal. Of course, as the case may be, the receiver unit 45 may be able to further process the electrical signal, for example to electrically regenerate the received signal.

In the following, the communication between a central node and a predetermined remote note will be explained.

In general, a unidirectional or bidirectional communication is possible between a remote node 5 and a central node 3, 7 or between two remote nodes. In the following, the communication is described between a remote node 5 and a central node 3, 7 as is the case if the network architecture 1 is used for a sensor network.

At first, it is to be mentioned that the communication is principally effected by transmitting and receiving digital optical signals over the optical transmission paths between the remote nodes 5 and the central nodes 3, 7, respectively, the digital optical signals comprising at least one frame. Each frame at least includes content data and address data. The address data designate the end node of the communication path (i.e. they include the address of the respective central node or the selected remote node). Further, a frame will also include the address of the node 3, 7, 5 that has originally created the respective transmit signal.

If the i-th remote node 5 ONUi creates a digital optical signal it is, as already mentioned, supplied to both the western and eastern connection ports 9, 11 and thus transmitted in both directions. If the signal created is addressed to the central node 3, the communication path also includes the remote nodes 5 ONU1 to ONU(i−1). The signal transmitted in direction to ONU(i−1) is received by this remote node 5 via the eastern connection port 9, the connection network 15 realized by the optical 2×2 coupler 35 and the receiver unit 19. The electrically converted signal is supplied to the controller device 27 which at first detects whether the frame is addressed to the respective remote node ONU(i−1). If so, the signal received is output by the control unit for further processing. If not, the controller device 27 creates a regenerated signal or frame that includes the same content and address data as the frame received.

Preferably, the control device 27 performs a 3D regeneration for the signal received, that is, a signal regeneration with respect to the signal timing, shape and amplitude.

Further, the control device 27 preferably includes a marker within the frame, e.g. the address of ONU(i−1), that includes the information that the signal has been regenerated by the respective remote node 5 ONU(i−1). Then, the frame is forwarded to the transmitter unit 21 which creates a corresponding optical regenerated signal that is supplied to the western optical connection port 11 of ONU(i−1). This procedure is repeated in each remote node 5 within the communication path. Finally, the last regenerated optical signal is received by the central node 3 via the connection port 13, the optical 2×2 coupler and the receiver unit 45.

The data transmission in the reverse direction is effected correspondingly. The optical digital transmit signal is created by the remote node 3, and the last regenerated signal (created by ONU(i−1)) is received by the selected remote node 5 (ONUi).

As each remote node 5 generating a regenerated optical signal transmits the regenerated signal in both directions, it is necessary to avoid an endless loop of signals transmitted back and forth.

A simple method to avoid this is, as already mentioned, to include a marker in the regenerated signals or frames indicating that the respective remote node has already regenerated the signal. Thus, if a selected remote node 5 transmits a regenerated or transmit signal created in both directions and the neighboring remote nodes 5 regenerate this signal, it is "reflected" back (as the case may be, from both sides) to the selected remote node 5. The selected remote node 5 may then suppress (again) creating a regenerated signal if it detects its own marker within the signal or frame received.

Even if this "suppression" method or a suitable method is applied, the signal created by the selected remote node 5 is transmitted to both ends of the chain structure, i.e. to both central nodes 3, 7, if existent. Thus, if the two central nodes 3, 7 are provided at the same location, the (usually shorter communication path) may serve as working path and the remaining portion of the open-ring structure may serve as protection path.

Of course, as an alternative, transmitting the data to both ends of the chain structure may be avoided. For this purpose, each remote node may comprise a storage means for storing information concerning the network structure (which may include the information identifying the own position within the chain-like network). In this way, a remote node may examine a signal or frame received with respect to the addresses of the signal creating node and the signal destination. If it is detected that the respective remote node is not within the communication path, creating a regeneration signal can be avoided. Thus, only the directly neighboring remote node 5 of an established communication link (i.e. ONU(i+1) in the above example) would be affected as it receives the transmit signal created by the remote node 5 at the end of the transmission link. At least the remote nodes 5 ONU(i+2) to ONUn may in this case be used to establish a further communication link.

The network and network node architectures as well as the transmission methods described above are especially suitable for setting up an optical transmission network having a chain-like structure at low cost. The transmission capacity is reduced as compared to known linear TDM transmission networks, but the remote nodes reveal a very simple and cheap design. The time delay or latency caused by each signal regeneration is acceptable especially in low bit-rate data transmission applications.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

LIST OF REFERENCE SIGNS

1 fiber-optic network architecture
3 western central node (OLT1)
5 remote node
7 eastern central node (OLT2)
9 eastern optical connection port
11 western optical connection port
13 connection port of OLTi
15 optical connection network
17 transceiver device
19 receiver unit
21 transmitter unit
23 internal optical receiving port
25 internal optical transmitting port
27 controller device
29 optical isolator
35 optical 2×2 coupler of 5
37 optical 2×2 coupler of 3, 7
39 transmitter unit of OLTi
41 optical isolator of OLTi
45 receiver unit of OLTi

The invention claimed is:

1. A remote node device for use in a fiber-optic network, for low bit-rate data transmission, the fiber-optic network having a central node; and a plurality of remote nodes serially connected to each other or to the central node, respectively, the central node and the remote nodes being configured for communicating by means of digital optical signals created by the central node or a respective remote node, each digital optical signal comprising a data frame, the remote node constructed wherein:
    (a) the remote node comprises an optical connection network, a single transceiver device comprising an optical receiver unit and an optical transmitter unit, and an electronic controller device for controlling the transceiver device;
    (b) the optical connection network comprises a western optical connection port, an eastern optical connection port, an internal optical receiving port being connected to the optical receiver unit and an internal optical transmitting port being connected to the optical transmitter unit;
    (c) the controller device, the transceiver device and the optical connection network being constructed such that:
        (i) the controller device is operable to create at least one data frame for transmitting information from the remote node to the central node or a further selected remote node, the at least one data frame including content data supplied to the controller device and address data for addressing the central node, and the controller device further operable to control the optical transmitter unit such that a digital optical transmit signal according to the at least one data frame is created, the digital optical transmit signal being simultaneously supplied to the eastern and western optical connection port;
        (ii) for receiving information from the central node or a further selected remote node, the receiver unit is operable to receive a respective digital optical transmit signal created by the central node or the further selected further remote node or a digital optical echo signal created by another remote node, which is supplied to the western or eastern optical connection port, and which comprises at least one data frame including content data and address data for addressing the remote node, with at least a given power portion at the internal optical receiving port, and the controller device is operable to process the respective at least one data frame; and
        (iii) for regenerating a digital optical transmit or regenerated signal received, the receiver unit is operable to receive a digital optical transmit signal created by the central node or a remote node or a digital optical regenerated signal created by another remote node, which is supplied to the western or eastern optical connection port and which comprises at least one data frame including content data and address data not addressing the remote node, with at least a given power portion at the internal optical receiving port, and the controller device is operable to create a regenerated data frame including the same content and address data as the received data frame and controls the optical transmitter unit such that a digital optical regenerated signal according to the regenerated data frame is created, the digital optical regenerated signal being simultaneously output to both optical connection ports.

2. The remote node device of claim 1, wherein the optical connection network is constructed as a 2×2 port optical coupling means, two of the ports of the optical coupling means defining the western optical connection port and the eastern optical connection port, and the two other ports of the optical coupling means defining the internal optical receiving port and the internal optical transmitting port.

3. The remote node device of claim 1, characterized in that, when regenerating a digital optical transmit signal or regenerated digital optical signal that has been received, the controller device marks the at least one regenerated data frame as having been regenerated by the respective remote node and that, when having received a digital optical transmit or regenerated signal not addressed to the respective remote node, the controller device detects whether the frame of the signal received includes a marker indicating that the signal has already been regenerated by the respective remote node and, if so, suppresses the transmission of a regenerated digital optical regenerated signal.

4. The remote node device of claim 1, wherein the controller device performs a signal regeneration with respect to the signal timing, shape and amplitude.

5. The remote node device of claim 1, 3, or 4, wherein the controller device includes storage means for storing information concerning the fiber-optic network structure, that the controller device determines whether the respective remote node lies within the communication path between the central node or the further selected remote node and the remote node between which the information included in the optical transmit signal received or in the regenerated optical signal received is to be exchanged, and that the controller device suppresses creating a regenerated signal if the position of the remote node is outside the communication path.

6. The remote node device of claim 1, wherein the western optical connection port and the eastern optical connection port are designed as single fiber working ports adapted to be connected to a single optical waveguide.

7. A fiber-optic network system, for a fiber-optic sensor network requiring low data transmission bit-rates, the system comprising:
a central node including an optical connection port and a plurality of remote nodes, each remote node including a western and eastern optical connection port the central node and the remote nodes connected in series to each other;
the central node and each of the remote nodes being capable of communicating by means of digital optical signals created by the central node or a respective remote node, each digital optical signal comprising at least one data frame including content data and address data; and
each of the remote nodes is constructed wherein:
(a) the remote node comprises an optical connection network, a single transceiver device comprising an optical receiver unit and an optical transmitter unit, and an electronic controller device for controlling the transceiver device;
(b) the optical connection network comprises a western optical connection port, an eastern optical connection port, an internal optical receiving port being connected to the optical receiver unit and an internal optical transmitting port being connected to the optical transmitter unit;
(c) the controller device, the transceiver device and the optical connection network being constructed such that:
(i) the controller device is operable to create at least one data frame for transmitting information from the remote node to the central node or a further selected remote node, the at least one data frame including content data supplied to the controller device and address data for addressing the central node, and the controller device further operable to control the optical transmitter unit such that a digital optical transmit signal according to the at least one data frame is created, the digital optical transmit signal being simultaneously supplied to the eastern and western optical connection port;
(ii) for receiving information from the central node or a further selected remote node, the receiver unit is operable to receive a respective digital optical transmit signal created by the central node or the further selected further remote node or a digital optical echo signal created by another remote node, which is supplied to the western or eastern optical connection port, and which comprises at least one data frame including content data and address data for addressing the remote node, with at least a given power portion at the internal optical receiving port, and the controller device is operable to process the respective at least one data frame; and
(iii) for regenerating a digital optical transmit or regenerated signal received, the receiver unit is operable to receive a digital optical transmit signal created by the central node or a remote node or a digital optical regenerated signal created by another remote node, which is supplied to the western or eastern optical connection port and which comprises at least one data frame including content data and address data not addressing the remote node, with at least a given power portion at the internal optical receiving port, and the controller device is operable to create a regenerated data frame including the same content and address data as the received data frame and controls the optical transmitter unit such that a digital optical regenerated signal according to the regenerated data frame is created, the digital optical regenerated signal being simultaneously output to both optical connection ports.

8. The fiber-optic network system of claim 7, wherein the network system further comprises a second central node comprising an optical connection port connected to the last remote node of the serially connected remote nodes.

9. The fiber-optic network system of claim 8, wherein the two central nodes are provided at the same location and arranged so that the network architecture forms an open ring architecture providing fiber protection.

10. A method for transmitting digital data in a fiber-optic network, especially for low bit-rate data transmission, the network (1) comprising a central node (3, 7) including an optical connection port (13) and a plurality of remote nodes (5), each remote node (5) including a western and eastern optical connection port (11, 9), the central node (3, 7) and the remote nodes (5) connected in series to each other by means of a fiber-optic path forming a fiber-optic chain-like structure, the method comprising the steps of:
(a) creating, in the central node (3, 7), a digital optical transmit signal addressed to a selected remote node (5) and outputting the digital optical signal to the fiber-optic path in direction of the selected remote node (5), or creating, in a selected remote node (5), a digital optical transmit signal addressed to the central node (3, 7) or to a further remote node (5) and outputting the digital optical signal in both directions to the fiber-optic path connected to the western and eastern optical connection ports (11, 9), the digital optical transmit signal created in the central node (3, 7) or the selected remote node (5) comprising at least one data frame including content data and address data,
(b) in each of the remote nodes (5) in the path between the selected remote node (5) and the central node (3, 7):
(i) receiving the digital optical transmit signal or a regenerated optical signal created by a neighboring remote node (5),
(ii) creating a regenerated signal that is output in both directions, the regenerated optical signal comprising at least one data frame and including identical content data and address data and further including marker data identifying the regenerated optical signal as having been regenerated by the respective remote node, and
(iii) suppressing the creation of a regenerated optical signal if the optical transmit signal or the regenerated optical signal received is detected as already being marked as having been regenerated by the respective remote node.

11. The method for transmitting digital data in a fiber-optic network according to claim 10, the network (1) comprising a second central node (3, 7) at the other end of the fiber-optic chain-like structure, wherein both central nodes (3, 7) are provided at the same location and wherein a first communication path between a selected remote node (5) and a first one of the central nodes (3, 7) is used as a working path and a second communication path between the selected remote node (5) and the second one of the central nodes (3, 7) is used as a protection path.

12. The method according to claim 11, wherein an optical transmit signal created in a selected remote node (5) is simultaneously transmitted in both directions to both central nodes (3, 7) and wherein the central nodes or a higher-level control unit connected to the central nodes (3, 7) decide which of the signals received is to be used as a receive signal that is further processed or evaluated.

13. The method according to claim 10 or 11, wherein each remote node creates a regenerated optical signal only if the position of the remote node lies within the communication path between the respective central node (3, 7) and the respective remote node (5).

* * * * *